(No Model.)

D. W. BRUNTON.
VELOCIPEDE CAR.

No. 508,500. Patented Nov. 14, 1893.

Witnesses:
J. M. Witherow
G. T. Myers

Inventor,
David W. Brunton,
By Hopkins & Atkins
Attorneys

THE NATIONAL LITHOGRAPHING COMPANY,
WASHINGTON, D. C.

United States Patent Office.

DAVID WILLIAM BRUNTON, OF ASPEN, COLORADO, ASSIGNOR OF ONE-HALF TO THE SHEFFIELD CAR COMPANY, OF THREE RIVERS, MICHIGAN.

VELOCIPEDE-CAR.

SPECIFICATION forming part of Letters Patent No. 508,500, dated November 14, 1893.

Application filed February 16, 1893. Serial No. 462,558. (No model.)

*To all whom it may concern:*

Be it known that I, DAVID WILLIAM BRUNTON, a subject of the Queen of Great Britain, (but I have declared my intention of becoming an American citizen,) residing at Aspen, county of Pitkin, and State of Colorado, have invented certain new and useful Improvements in Velocipede-Cars, of which the following is a specification, reference being had to the accompanying drawings.

The object of my invention is to produce an improved four-wheeled velocipede car; which, on account of its method of operation and its entire freedom of obstructions in front of the rider, renders it especially useful in mining tunnels.

Heretofore it has been impracticable to use velocipedes of any kind in such tunnels, because of the constant danger of running into light falls of rock upon the track, and the impossibility of keeping the pedals clean in underground workings. By my invention, however, I avoid the use of pedals altogether, and I practically eliminate the danger in collision with any ordinary slight obstruction.

Figure 1:
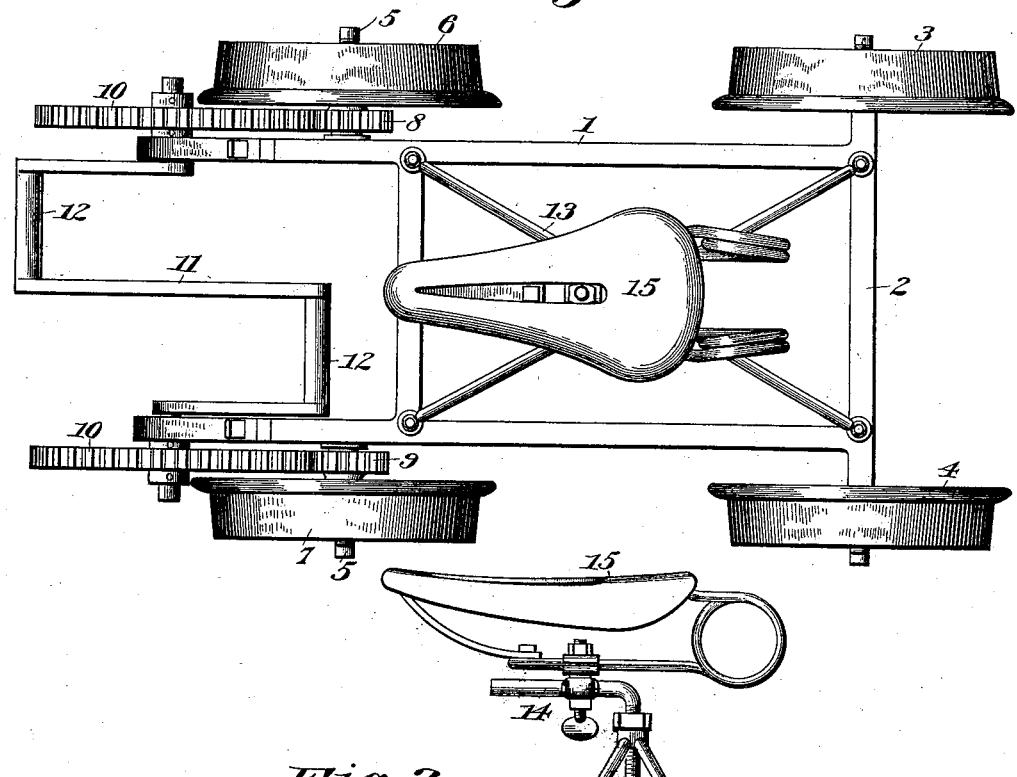
Figure 2:
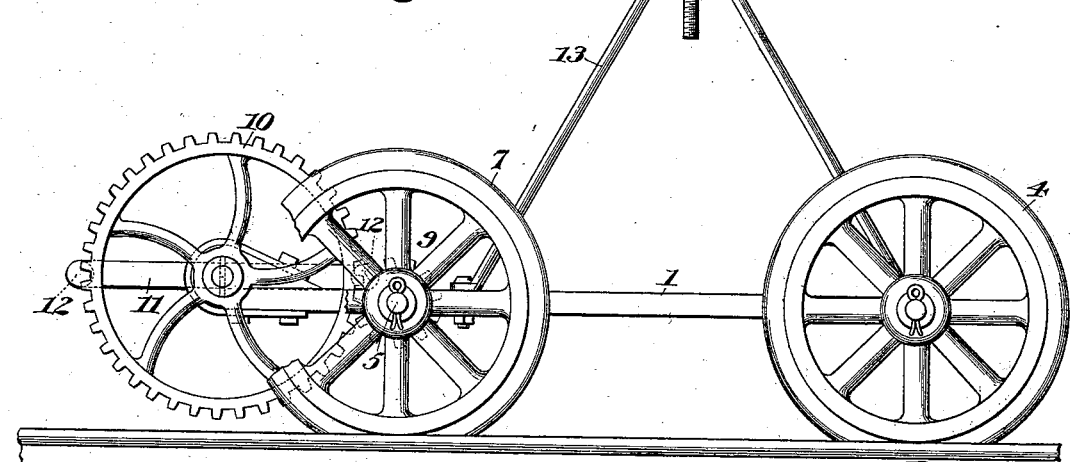

In the accompanying drawings, Figure 1 is a top plan view of my machine. Fig. 2 is a side elevation thereof.

Referring to the figures on the drawings, 1 indicates the frame of my car, which is preferably made for the sake of strength and lightness of metal, as iron or steel. Upon its rear end it is provided with an axle 2, upon which are secured wheels 3 and 4. Upon its forward end it is provided with stud-axles 5, upon which are mounted wheels 6 and 7 having gear hubs 8 and 9 respectively by which they may be driven.

10 indicates each of a pair of power gears secured respectively to each end of a double crank-shaft 11.

12 indicates smooth round foot supports on the crank-shaft, by which it may be operated.

13 indicates an accurately centered seat support which carries upon an angle-arm 14 an ordinary bicycle saddle 15 having the usual attachments. In driving a crank in the same direction in which the wheels of a vehicle revolve it is necessary to use pedals, which, as above stated, are impracticable for mining purposes.

By my invention I revolve the crank-shaft in the direction opposite to that in which the wheels revolve, and am enabled thereby to employ back pedaling, as it is commonly called. In driving with pedals the ball of the foot is used; but in back pedaling the hollow of the foot is used, so that it is only necessary to employ smooth round bearing surfaces upon the cranks, thereby dispensing entirely with the pedals.

What I claim is—

1. In a velocipede car, the combination with a rectangular frame and driving mechanism, of a seat accurately centered above, and supported upon braces diverging therefrom to each of the corners, respectively, of the frame and entirely free from obstructions in front of the seat, substantially as specified.

2. In a velocipede car, the combination with a frame and axle and wheels on one end thereof, of stud-axles and gear hub wheels on the other end, a crank-shaft and gears meshing with the gear hubs, and a seat, substantially as set forth.

In testimony of all which I have hereunto subscribed my name.

DAVID WILLIAM BRUNTON.

Witnesses:
CHAS. ANDERSON,
HARRY G. KOCH.